(12) United States Patent
March (10) Patent No.: US 11,136,893 B2
(45) Date of Patent: Oct. 5, 2021

(54) GIMBALS AND METHODS OF MANUFACTURING GIMBALS

(71) Applicant: ROLLS-ROYCE plc, London (GB)

(72) Inventor: Richard N. March, Derby (GB)

(73) Assignee: ROLLS-ROYCE PLC, London (GB)

( * ) Notice: Subject to any disclaimer, the term of this patent is extended or adjusted under 35 U.S.C. 154(b) by 247 days.

(21) Appl. No.: 16/406,560

(22) Filed: May 8, 2019

(65) Prior Publication Data

US 2019/0376399 A1 Dec. 12, 2019

(30) Foreign Application Priority Data

Jun. 7, 2018 (GB) ..................................... 1809371

(51) Int. Cl.
| | | |
|---|---|---|
| *F16L 27/11* | (2006.01) | |
| *F01D 9/06* | (2006.01) | |
| *B23K 20/12* | (2006.01) | |
| *F16L 27/08* | (2006.01) | |
| *F16L 27/02* | (2006.01) | |

(Continued)

(52) U.S. Cl.
CPC .............. *F01D 9/06* (2013.01); *B23K 20/129* (2013.01); *F02K 3/06* (2013.01); *F16L 27/02* (2013.01); *F16L 27/0857* (2013.01); *F16L 27/11* (2013.01); *B23K 2101/001* (2018.08); *B23K 2103/08* (2018.08); *F05D 2230/239* (2013.01); *F05D 2260/30* (2013.01); *F05D 2260/60* (2013.01)

(58) Field of Classification Search
CPC ............ B23K 20/129; B23K 2101/001; B23K 2103/08; F05D 2230/239; F05D 2260/30; F05D 2260/60

USPC ......................................................... 285/265
See application file for complete search history.

(56) References Cited

U.S. PATENT DOCUMENTS 3,915,482 A * 10/1975 Fletcher .............. F16L 27/0857
285/226
4,480,857 A * 11/1984 Graves ................ F16L 27/0857
285/226

(Continued)

FOREIGN PATENT DOCUMENTS

GB 627 120 A 7/1949
GB 2552686 A 2/2018

(Continued)

OTHER PUBLICATIONS

Oct. 23, 2019 Search Report issued in European Patent Application No. 19 17 2968.

(Continued)

*Primary Examiner* — Richard A Edgar
(74) *Attorney, Agent, or Firm* — Oliff PLC (57) ABSTRACT

Disclosed herein is a gimbal body comprising: an end part (51) for use in welding the gimbal body to a pipe; and a main body (53) attached to the end part (51); wherein: the end part (51) is made of a first material; and the main body (53) is made of a second material that is different from the first material. Embodiments provide a new method of manufacturing a gimbal that allows the use of the most appropriate materials for high temperature and high pressure performance whilst overcoming manufacturing and installation problems experienced by known gimbals constructed with such materials.

16 Claims, 5 Drawing Sheets

(51) Int. Cl.
*F02K 3/06* (2006.01)
*B23K 101/00* (2006.01)
*B23K 103/08* (2006.01)

(56) References Cited

U.S. PATENT DOCUMENTS

| | | | | |
|---|---|---|---|---|
| 5,112,088 | A * | 5/1992 | Moore | F16L 27/0857 |
| | | | | 285/114 |
| 7,458,497 | B2 * | 12/2008 | Onuma | B23K 20/12 |
| | | | | 228/112.1 |
| 2004/0245770 | A1 | 12/2004 | Christianson et al. | |
| 2013/0300106 | A1 | 11/2013 | French et al. | |
| 2014/0133986 | A1 * | 5/2014 | Matsuoka | C22C 38/04 |
| | | | | 416/124 |
| 2019/0145316 | A1 * | 5/2019 | Schwarz | F02C 9/18 |
| | | | | 60/728 |

FOREIGN PATENT DOCUMENTS

| | | |
|---|---|---|
| WO | 2008/072303 A1 | 6/2008 |
| WO | 2009/078907 A1 | 6/2009 |

OTHER PUBLICATIONS

Nov. 27, 2018 Search Report issued in Great Britain Patent Application No. 1809371.6.

* cited by examiner

FIG. 6

GIMBALS AND METHODS OF MANUFACTURING GIMBALS

CROSS-REFERENCE TO RELATED APPLICATIONS

This specification is based upon and claims the benefit of priority from UK Patent Application Number 1809371.6 filed on 7 Jun. 2018, the entire contents of which are incorporated herein by reference.

TECHNOLOGICAL FIELD

The present disclosure relates to gimbals and methods of manufacturing gimbals. More particularly, embodiments provide new methods of manufacturing gimbals that allow the use of the most appropriate materials for high temperature and high pressure performance whilst overcoming manufacturing and installation problems experienced by known gimbals constructed with such materials.

BACKGROUND

A gimbal assembly may be used to provide flexibility and stiffness in pipework systems. The gimbal assembly should be flexible enough to accommodate pipe movements, but they should also exhibit good wear properties and have predictable stiffness's. However, optimum materials may not be readily welded and heat treatment of the gimbal assembly may not be possible since it may affect the stiffness of flexible parts.

BRIEF SUMMARY

According to a first aspect, there is provided a gimbal body comprising: an end part for use in welding the gimbal body to a pipe; and a main body attached to the end part; wherein: the end part is made of a first material; and the main body is made of a second material that is different from the first material.

In the first aspect, the end part and main body may be attached to each other by a solid state joint, such as a friction weld.

In the first aspect, the first material may be a material that is easier to arc weld to than the second material, such as a solid solution strengthened nickel alloy; and the second material may be a material that is more difficult to arc weld to than the first material, such as a precipitation hardened nickel alloy.

The first aspect may further comprise: a second end part for use in welding the gimbal body to a second pipe; and a second main body attached to the second end part; wherein: said main body is attached to the second main body by one or more pivot mechanisms; the second end part is made of the first material; and the second main body is made of the second material.

In the first aspect, the second end part and second main body may be attached to each other by a solid state joint, such as a friction weld.

According to a second aspect, there is provided a method of manufacturing a gimbal body, the method comprising: solid state welding an end part of the gimbal body to a main body of the gimbal body; wherein: the end part is for use in welding to a pipe; the end part is made of a first material; and the main body is made of a second material that is different from the first material.

In the second aspect: the first material may be a material that is easier to arc weld to than the second material, such as a solid solution strengthened nickel alloy; and the second material may be one or more of: a material that is more difficult to arc weld to than the first material; a precipitation hardened nickel alloy; and a pre-heat treated nickel alloy that will become a precipitation hardened nickel alloy after it has been heat treated.

In the second aspect, the solid state welding may be friction welding, such as rotary friction welding.

The second aspect may further comprise heat treating at least the main body before and/or after the end part and main body have been solid state welded together.

The second aspect may further comprise: solid state welding, a second end part of the gimbal body to a second main body of the gimbal body; and providing one or more pivot mechanism attachments between said main body and the second main body; wherein: the second end part is for use in welding to a second pipe; the second end part is made of the first material; and the second main body is made of the second material.

The second aspect may further comprise heat treating at least the main body before and/or after the end part has been solid state welded to the main body and before and/or after the second end part has been solid state welded to the second main body.

According to a third aspect, there is provided a gimbal body manufactured according to the second aspect.

According to a fourth aspect, there is provided a gimbal comprising: a gimbal body according to any of the first aspect or the third aspect; and a flexible bellows for providing a stiffness to the relative movement of each end of the gimbal.

The third aspect may further comprise: a liner that is an inner tube through the gimbal; wherein the liner is arranged so that a fluid may flow from a first end of the gimbal to a second end of the gimbal via the liner.

According to a fifth aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft, wherein: the gas turbine engine comprises one or more gimbals according to the fourth aspect.

In the fifth aspect: the turbine may be a first turbine, the compressor may be a first compressor, and the core shaft may be a first core shaft; the engine core may further comprise a second turbine, a second compressor, and a second core shaft connecting the second turbine to the second compressor; and the second turbine, second compressor, and second core shaft may be arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

In any gas turbine engine as described and/or claimed herein, combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may com- monly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any plat- form.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1,800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1,200 rpm to 2,000 rpm, for example in the range of from 1,300 rpm to 1,800 rpm, for example in the range of from 1,400 rpm to 1,600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip, loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^1/(ms^{-1})^2$). The fan tip loading may be in an inclusive range bounded by any two of the values in the previous sentence (i.e. the values may form upper or lower bounds).

Gas turbine engines in accordance with the present dis- closure may have any desired bypass ratio, where the bypass ratio is defined as the ratio of, the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1,600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have a y desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by id the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10,000 m to 15,000 m, for example in the range of from 10,000 m to 12,000 m, for example in the range of from 10,400 m to 11,600 m (around 38,000 ft), for example in the range of from 10,500 m to 11,500 m, for example in the range of from 10,600 m to 11,400 m, for example in the range of from 10,700 m (around 35,000 ft) to 11,300 m, for example in the range of from 10,800 m to 11,200 m, for example in the range of from 10,900 m to 11,100 m, for example on the order of 11,000 m. The cruise conditions may correspond to standard atmospheric conditions at any given altitude in these ranges.

Purely by way of example, the cruise conditions may correspond to: a forward Mach number of 0.8; a pressure of 23,000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION

Embodiments will now be described by way of example only, with reference to the Figures, in which.

DETAILED DESCRIPTION

Figure 1:
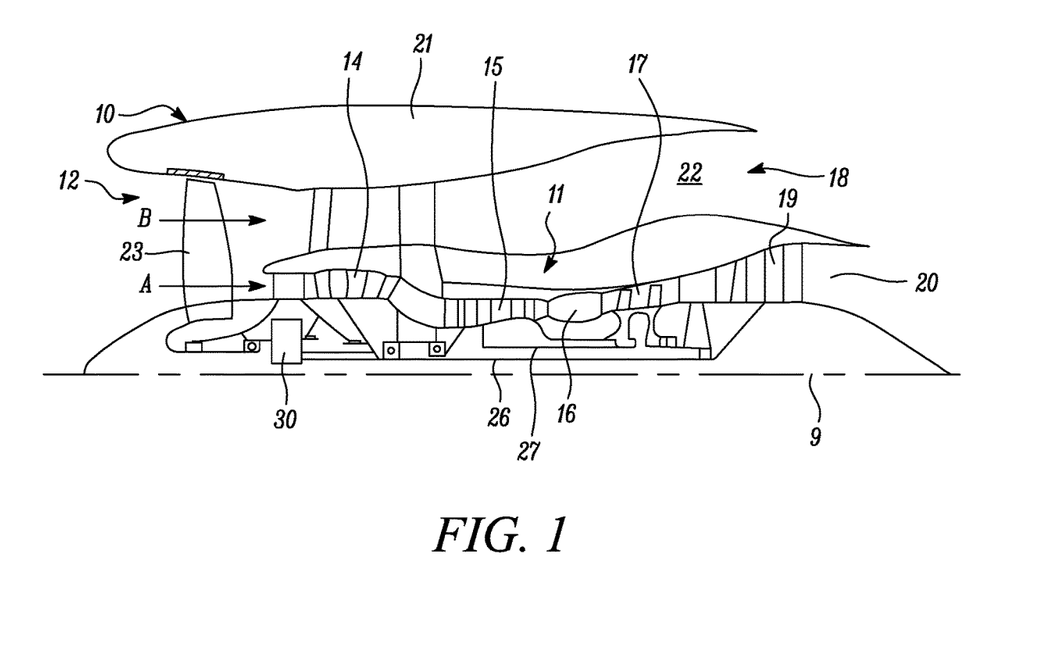
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
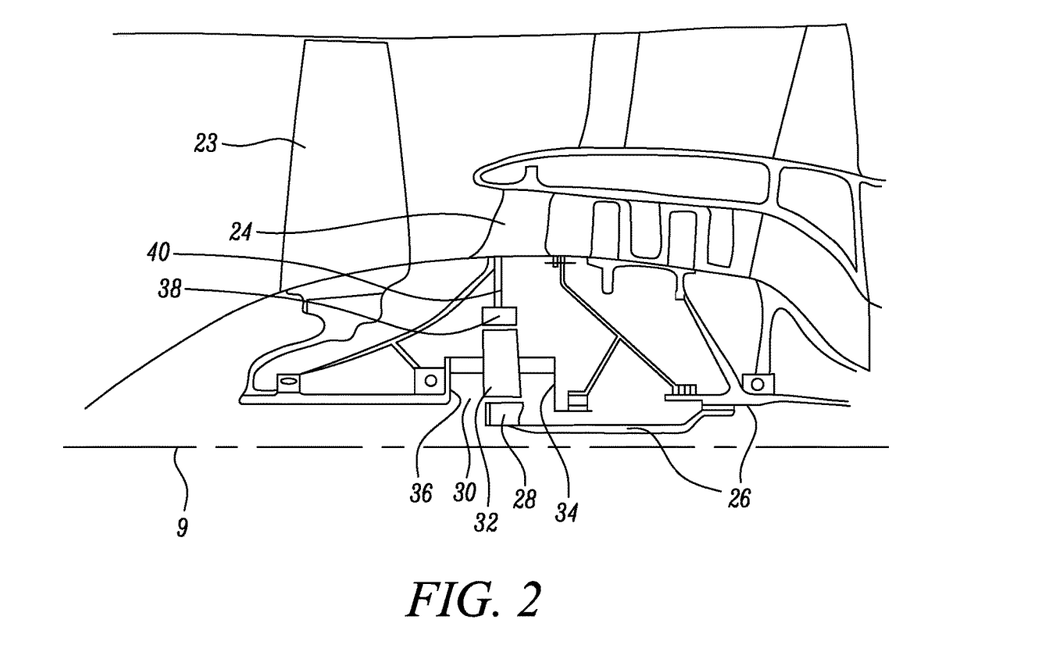
FIG. 2 is a close up sectional side view of an upstream of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
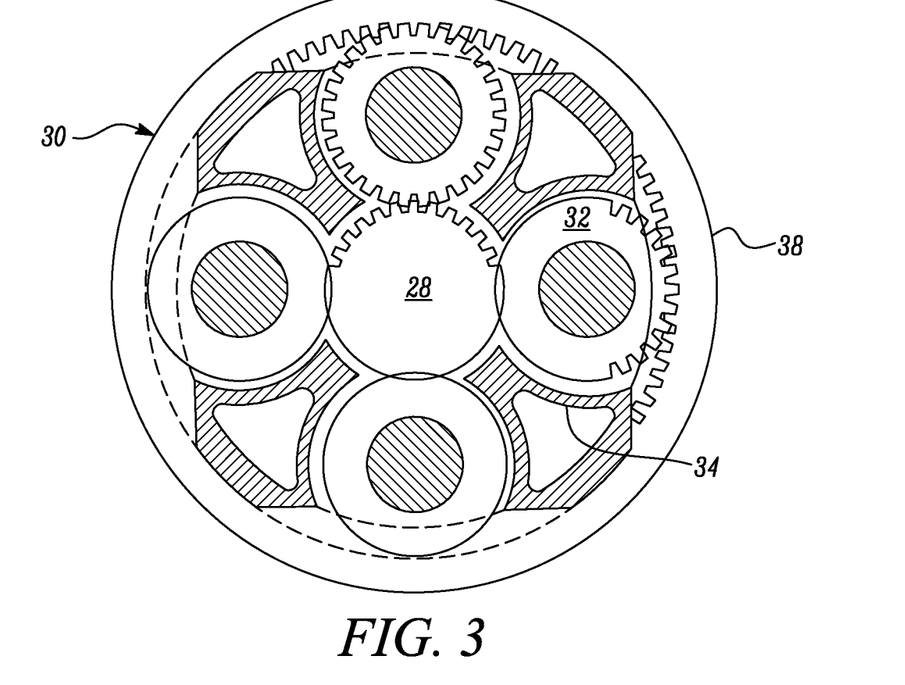
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 8 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Gas turbine engines 10 produce very high pressure air which is ducted in pipe systems for use in various parts of the gas turbine engine 10 and/or in applications external from the gas turbine engine 10. The pipe system requires flexible joints to accommodate irregular internal passages of the aircraft, or other application, in which the pipe system is used. During operation of the gas turbine engine 10, high temperatures and fluctuations in pressure can cause stress on the pipes and joints of the pipe system. The sections of pipe system may therefore be connected to each other by gimbals. Gimbals are joints that allow a limited amount of movement to accommodate stresses and provide the required amount of flexibility for installation and operation of the pipe system.

A gimbal may be flexible enough to accommodate movements of different sections of a pipe system, exhibit good wear properties and have a predictable stiffness. In addition, the manufacturing and installation cost of a gimbal may be a factor to be considered.

A problem with known gimbals is that the most appropriate materials to be used for the outer body of a gimbal, so that the gimbal has high temperature performance and good wear resistance, are difficult materials to weld. When such materials are used, any welds need to be performed prior to the necessary heat treatment of the materials. When the heat treatment is applied, the heat treatment affects the performance of the gimbal, in particular the stiffness of the internal components of the gimbal.

Arrangements of the present disclosure provide a new construction of gimbal and method of manufacture thereof. Gimbals according to the present disclosure may be manufactured using the most appropriate materials for achieving high temperature performance and good wear resistance. The gimbals may not experience the above problems of being difficult to weld and the applied heat treatment affecting the performance of internal components of the gimbal.

Figure 4A:
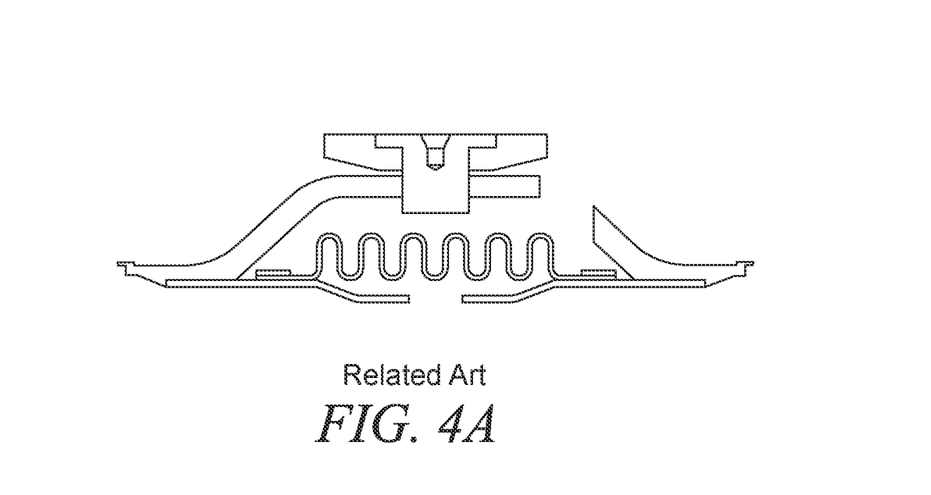
FIG. 4A is cross section of a wall of a known design of gimbal.

FIG. 4A shows a cross section of a wall of a known design of gimbal. The shown cross-section is only through an upper part of the gimbal and the cross-section through the lower part, which would be substantially symmetric to the upper part, is not shown. Many variations of the gimbal design shown in FIG. 4A are known and possible. For example, the inner liner and outer body are shown in FIG. 4A with each having a gap in their length. However, the inner liner and/or outer body may alternatively have no gaps so that they are unbroken, i.e. extend continuously, along the length of the gimbal.

Figure 4B:
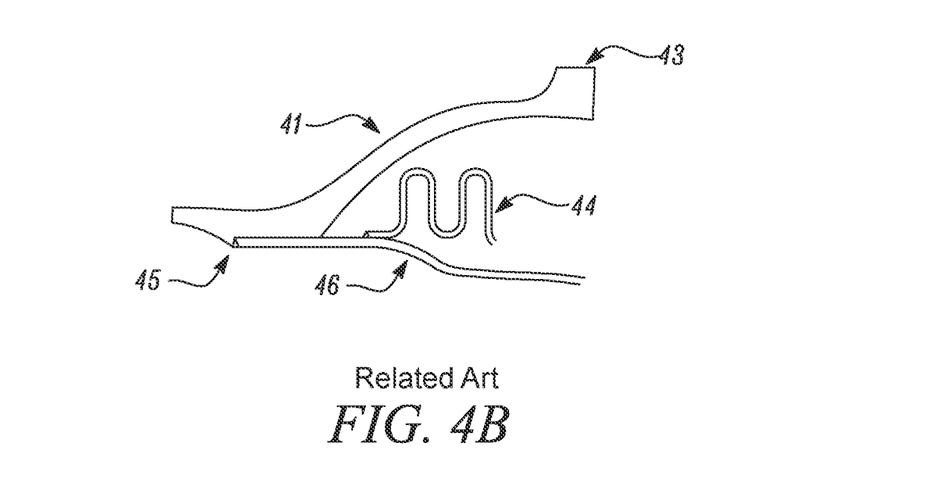
FIG. 4B is a cross section of a wall of a known design of gimbal.

FIG. 4B shows an end of the cross section of the known design of gimbal in FIG. 4A in more detail.

The gimbal is substantially linear and comprises an inner tube between its two ends. Each of the ends of the gimbal can be welded to the end of a pipe. The gimbal comprises a tubular liner 46 that provides the inner tube through which the contents of the pipes that the gimbal is connected to pass through. The gimbal also has a tubular bellows 44 and the bellows provide a degree of stiffness to the gimbal so the possible relative movement of the ends of the gimbal can be controlled to within known limits. The bellows are covered by a gimbal body 41, that can also be referred to as a clevis. The ends of the bellows can be welded to the tubular liner 46 and/or gimbal body 41. The gimbal body 41 typically has two orthogonal pivoting mechanisms and the ends of the gimbal can therefore move relative to each other by pivoting about one, or both, of the pivoting mechanisms. The gimbal body protects the bellows 44 and liner 46 components from the external environment.

The cross-section shown in FIG. 4B is through half of one of the ends of the gimbal. The end of the gimbal has a substantially uniform cross-section about the longitudinal axis of the gimbal and each end of the gimbal has substantially the same construction.

FIG. 4B shows a cross-section through pivot 43. The gimbal may typically have another pivot diametrically opposite pivot 43 with the pivots allowing relative movement of the gimbal ends about a first axis that intersects the pivots. The gimbal may typically also have a second pair of pivots that are also diametrically opposite each other. The second pair of pivots would typically be arranged so that a second axis, that intersects the second pair of pivots, is perpendicular to the first axis. The gimbal ends may be able to move about both the first and the second axes.

The gimbal body 41 and pivot 43 components of a gimbal may be arranged to have high temperature performance and good wear resistance. These components of the gimbal body are therefore preferably constructed from precipitation hardened nickel alloys.

The liner 46 may be made from solid solution strengthened nickel alloys. The liner 46 is welded, such as by tungsten inert gas (TIG) welding, to the gimbal body 41 at weld point 45.

The pipes that the gimbal is to be attached to may also be made of solid solution strengthened nickel alloys.

The gimbal body, which is made from precipitation hardened nickel alloys, may be heat treated. This may cause a problem with both the construction of the gimbal and the welding of the gimbal to the ends of pipes. It may not be possible to weld precipitation hardened nickel alloys after they have been heat treated because the welding may cause the precipitation hardened nickel alloys to crack. It is therefore necessary to weld the liner 46 to gimbal body 41 at the weld point 45 and then weld each end of the gimbal to a pipe before the gimbal body 41 has been heat treated, i.e. the gimbal body is in a 'soft' condition when the welding is performed.

After the gimbal has been welded to pipe ends, the gimbal body may then be heat treated. However, this heat treatment affects the stiffness of the flexible parts of the gimbal, in particular the bellows 44, and causes unreliable performance of the gimbal.

Attempts to avoid the above problems have resulted in gimbal bodies being constructed from materials that do not provide the best temperature and wear performance and/or complicated joint arrangements being required.

Figure 5:
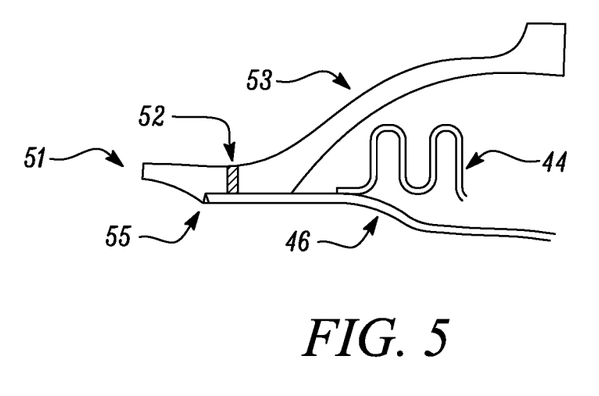
FIG. 5 is a cross section of a wall of a gimbal according to an embodiment.

FIG. 5 shows a cross-section of part of a gimbal according to an embodiment. The cross-section in FIG. 5 is a corresponding part of a gimbal to that described with reference to FIGS. 4A and 4B. As described with reference to FIGS. 4A and 4B, the gimbal according to embodiments may have two pivoting mechanisms that allow relative movement of the ends of the gimbal. The differences in the construction and manufacturing method of the gimbal according to embodiments to the gimbal described with reference to FIGS. 4A and 4B is described below.

In the gimbal according to embodiments, the gimbal body comprises an end part 51 and a main body 53. The end part 51 may be made of solid solution strengthened nickel alloy. The main body 53 may be made of precipitation hardened nickel alloy.

Advantageously, the main body 53 of the gimbal body can be made of precipitation hardened nickel alloy and therefore have good temperature and wear performance. The end part 51 can be made of solid solution strengthened nickel alloy and can be easily welded, such as by arc welding, to the end of a pipe. In addition, the heat treatment of the gimbal body can be performed before the gimbal has been fully assembled, and before the gimbal has been connected to a pipe, and so the heat treatment does not affect the stiffness of the internal components of the gimbal.

In the gimbal construction method according to an embodiment, the end part 51 and the main part 53 components of the gimbal body are manufactured separately and then joined together, at welding point 52, using solid state welding, such as friction welding.

Friction welding is a known technique for connecting components together. Friction welding differs from, for example, TIG welding in that it is not a fusion welding technique and is more of a forge welding technique. Friction welding techniques that may be used in embodiments are described in at least WO 2008/072303 A1 and WO 2009/078907 A1.

The annular cross-section of the connected parts of the end part 51 component and the main body 53 component of the gimbal allows rotary friction welding, also referred to spin friction welding, to be used. Rotary friction welding may comprise holding the components that are to be welded to each other in chucks with the longitudinal axes of the components aligned. One of the chucks holds one of the components stationary and the other chuck rotates the other component about the longitudinal axis. The components are then forced together. Due to the relatively small size and portable nature of the end part 51 and main body 53 components of a gimbal, rotary friction welding may be a suitable technique for attaching these components.

The end part 51 and main body 53 components may be friction welded together after the main body 53 has been forged but prior to the main body 53 being heat treated. The friction welding may be performed immediately after the main body 53 has been forged.

After the end part 51 and the main body 53 have been friction welded together to construct a gimbal body, and prior to the gimbal body being assembled with the other components on the gimbal, the gimbal body may be heat treated. The heat treatment also provides the advantage of relieving residual stress. Applying the heat treatment at this stage therefore both hardens the main body 53 and relieves residual stress in the friction weld joint.

After the gimbal body according to embodiments has been heat treated, it is assembled with the other components of the gimbal, such as the liner 46 and the bellows 44. The liner may be TIG welded to the end part 51 at weld point 55.

One, or both, ends of the gimbal may be manufactured according to the above techniques so that each end of the gimbal is substantially as shown in FIG. 5, with the substantial part of the outer body of the gimbal being constructed from precipitation hardened nickel alloys and the end parts of the outer body, that are for welding the gimbal to pipes, being constructed of solid solution strengthened nickel alloys.

Advantageously, the heat treatment applied to the main body 53 of the gimbal body is not also applied to the bellows 44 and liner 46 components of the gimbal and so the stiffness of these components is not affected by the heat treatment process. It is not a problem if the heat treatment affects the stiffness of the end part 51 of the gimbal body since the end part 51 is not one of the components of the gimbal that is required to be flexible. In addition, the weld between the end part 51 and the liner 46 at weld point 55 is a weld that can be easily performed between components that are both made from solid solution strengthened nickel alloy.

Embodiments include a gimbal with any dimensions as appropriate for the application of the gimbal. However, typical dimensions of gimbals according to embodiments may be a diameter in the range of about 50 mm to about 150 mm and a length of up to about 100 mm.

Figure 6:
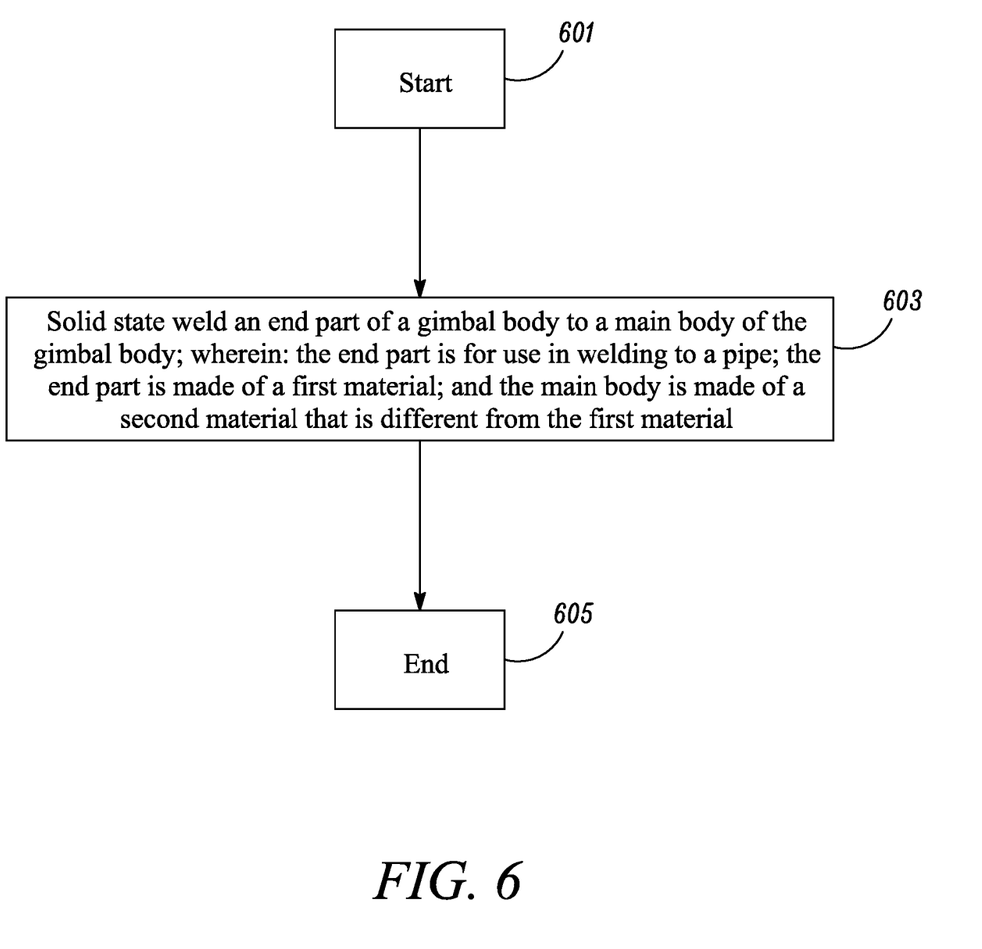
FIG. 6 is flowchart of a method according to an embodiment.

FIG. 6 is a flowchart of a process of manufacturing a gimbal body according to an embodiment.

In step 601, the process begins.

In step 603, an end part 51 of the gimbal body is solid state welded to a main body 53 of the gimbal body; wherein: the end part 51 is for use in welding to a pipe; the end part 51 is made of a first material; and the main body 53 is made of a second material that is different from the first material.

The process may further comprise heat treating at least the main body 53 before and/or after the end part 51 and main body 53 have been solid state welded together.

Additionally, the process may comprise solid state welding a second end part of the gimbal body to a second main body of the gimbal body; and providing one or more pivot mechanism attachments between said main body 53 and the second main body; wherein: the second end part is for use in welding to a second pipe; the second end part is made of the first material; and the second main body is made of the second material. The process may further comprise heat treating at least the main body before and/or after the end part 51 has been solid state welded to the main body 53 and before and/or after the second end part has been solid state welded to the second main body.

In step 605, the process ends.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

In particular, the above described techniques have been described with reference to the connection of a gimbal to a pipe of a gas turbine engine 10 of an aircraft. However, embodiments are not limited to this specific application and include any other application in which gimbals may be used, such as in the chemical engineering and other industries.

In the above-described embodiments, the end part 51 and main body 53 components are friction welded together after the main body 53 has been forged but prior to the main body 53 being heat treated. However, embodiments also include the friction welding, or other solid state welding, alternatively being performed after the main body 53 has been heat treated. A further heating process may then be performed after the solid state welding operation so as to relieve residual stress.

The above described techniques have been described with reference to the use of solid solution strengthened nickel alloys for the end part 51. However, embodiments include the use of other materials for the end part 51 and generally apply to all alloys/materials that are easy to arc weld to.

The above described techniques have been described with reference to the use of precipitation hardened nickel alloys for the main body 53 of the gimbal. However, embodiments include the use of other materials and generally apply to all alloys/materials that are difficult to arc weld to. In particular, the main body 53 may be constructed of any other material with which is difficult to apply arc welding and/or heat treatment techniques at an installation site of a device.

Embodiments have been described with reference to friction welding techniques. However, embodiments include the use of other solid state welding techniques than friction welding.

Embodiments generally include the provision of any device with different materials solid state welded to one, or both, of the ends of a main body of the device. Advantageously, the main body's properties, such as temperature and wear performance, are substantially as provided by the material of the main body and the different materials at the end of the device allow the device to be easily welded and can avoid heat treatment problems.

I claim:

1. A gimbal body comprising:
an end part for use in welding the gimbal body to a pipe; and
a main body attached to the end part;
wherein:
the end part is made of a first material, the first material being a solid solution strengthened nickel alloy;
the main body is made of a second material, the second material being a forged, precipitation hardened nickel alloy; and
the first material is friction welded to the second material.

2. The gimbal body according to claim 1, wherein:
the first material is easier to arc weld to than the second material; and
the second material is more difficult to arc weld to than the first material.

3. The gimbal body according to claim 1, further comprising:
a second end part for use in welding the gimbal body to a second pipe; and
a second main body attached to the second end part;
wherein:
said main body is attached to the second main body by one or more pivot mechanisms;
the second end part is made of the first material; and
the second main body is made of the second material.

4. The gimbal body according to claim 3, wherein the second end part and the second main body are attached to each other by a solid state joint.

5. A method of manufacturing a gimbal body, the method comprising:
solid state welding an end part of the gimbal body to a main body of the gimbal body;
wherein:
the end part is for use in welding to a pipe;
the end part is made of a first material the first material being a solid solution strengthened nickel alloy; and
the main body is made of a second material, the second material being a nickel alloy that is forged.

6. The method according to claim 5, wherein:
the first material is easier to arc weld to than the second material; and
the second material is a pre-heat treated nickel alloy that will become a precipitation hardened nickel alloy after being heat treated.

7. The method according to claim 5, wherein the solid state welding is friction welding.

8. The method according to claim 5, further comprising heat treating at least the main body before and/or after the end part and main body have been solid state welded together.

9. The method according to claim 5, further comprising:
solid state welding a second end part of the gimbal body to a second main body of the gimbal body; and
providing one or more pivot mechanism attachments between said main body and the second main body;
wherein:
the second end part is for use in welding to a second pipe;
the second end part is made of the first material; and
the second main body is made of the second material.

10. The method according to claim 9, further comprising heat treating at least the main body before and/or after the end part has been solid state welded to the main body and before and/or after the second end part has been solid state welded to the second main body.

11. A gimbal body manufactured according to the method according to claim 5.

12. A gimbal comprising:
a gimbal body according to claim 1; and
a flexible bellows for providing a stiffness to relative movement of a first end of the gimbal and a second end of the gimbal.

13. The gimbal according to claim 12, further comprising:
a liner that is an inner tube through the gimbal;
wherein the liner is arranged so that a fluid may flow from the first end of the gimbal to the second end of the gimbal via the liner.

14. A gas turbine engine for an aircraft comprising:
an engine core comprising a turbine, a compressor, and a core shaft connecting the turbine to the compressor;

a fan located upstream of the engine core, the fan comprising a plurality of fan blades; and a gearbox that receives an input from the core shaft and outputs drive to the fan so as to drive the fan at a lower rotational speed than the core shaft, wherein:

the gas turbine engine comprises one or more gimbals according to claim 13.

15. The gas turbine engine according to claim 14, wherein:

the turbine is a first turbine, the compressor is a first compressor, and the core shaft is a first core shaft;

the engine core further comprises a second turbine, a second compressor, and a second core shaft connecting the second turbine to the second compressor; and the second turbine, second compressor, and second core shaft are arranged to rotate at a higher rotational speed than the first core shaft.

16. The method according to claim 5, wherein the solid state welding is rotary friction welding.

\* \* \* \* \*